United States Patent [19]
Wigdahl et al.

[11] Patent Number: 5,622,038
[45] Date of Patent: Apr. 22, 1997

[54] GRID BAR STRUCTURE FOR A COTTON HARVESTER ROW UNIT

[75] Inventors: Jeffrey S. Wigdahl, Ames; Joel M. Schreiner, Ankeny, both of Iowa

[73] Assignee: Deere & Company, Moline, Ill.

[21] Appl. No.: 547,253

[22] Filed: Oct. 24, 1995

[51] Int. Cl.⁶ ..................................................... A01D 46/08
[52] U.S. Cl. ........................................ 56/28; 56/41; 56/50
[58] Field of Search ................................... 58/29, 30, 40, 58/41, 42, 43, 44, 45, 50, 47, 330

[56] References Cited

U.S. PATENT DOCUMENTS

| | | | |
|---|---|---|---|
| 3,673,773 | 7/1972 | Ferguson | 56/13.3 |
| 4,385,700 | 5/1983 | Hodges et al. | 209/539 |
| 4,821,497 | 4/1989 | Deutsch et al. | 56/40 X |
| 5,323,592 | 6/1994 | Davenport et al. | 56/41 X |

OTHER PUBLICATIONS

Deere & Company, Grid Bar Drawing, 1 page, dated 3 Dec. 1987.

*Primary Examiner*—Terry Lee Melius
*Assistant Examiner*—Robert Pezzuto

[57] ABSTRACT

A cotton picker row unit grid bar fabricated from a light extruded material has a hollow D-shaped cross section with a plant contacting wall of thickness substantially greater than the non-contacting walls for increased wearability and strength and reduced weight. An upright grid bar support with a compact U-shaped cross section includes opposed flanges connected by a rounded portion to reduce hairpinning of debris. Specially shaped apertures in the rounded portion support the ends of the grid bars in vertically spaced relationship, and grid bar posts cooperate with threaded screw members extending through the support to sandwich the grid bar ends between the flanges with a preselected clamping force.

16 Claims, 4 Drawing Sheets

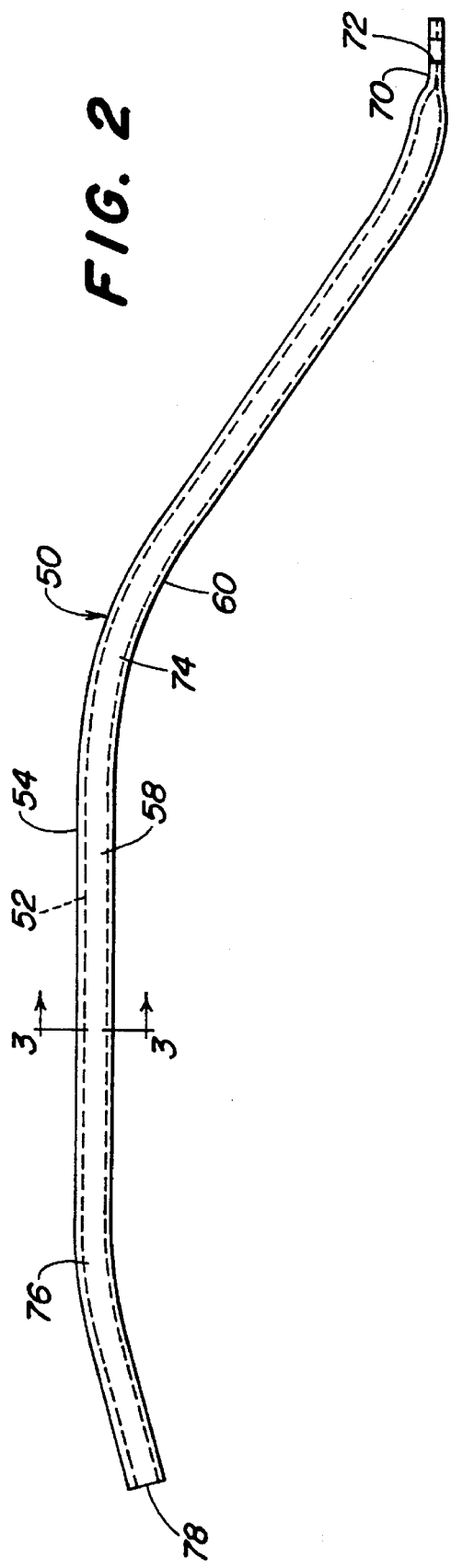
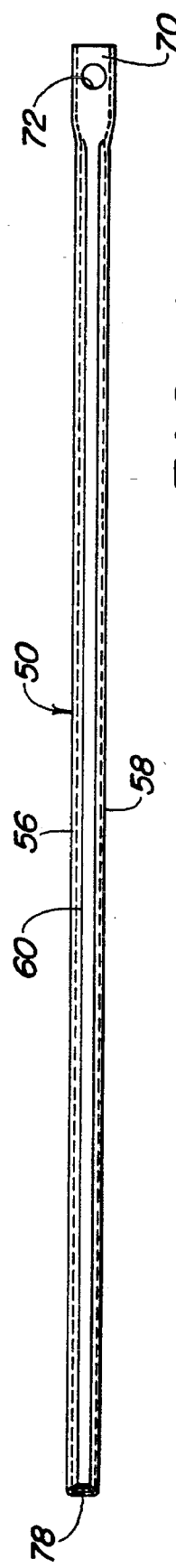
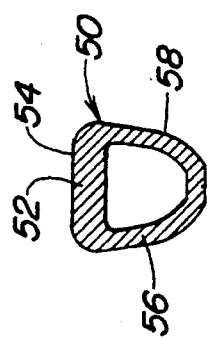
FIG. 2
FIG. 4
FIG. 3

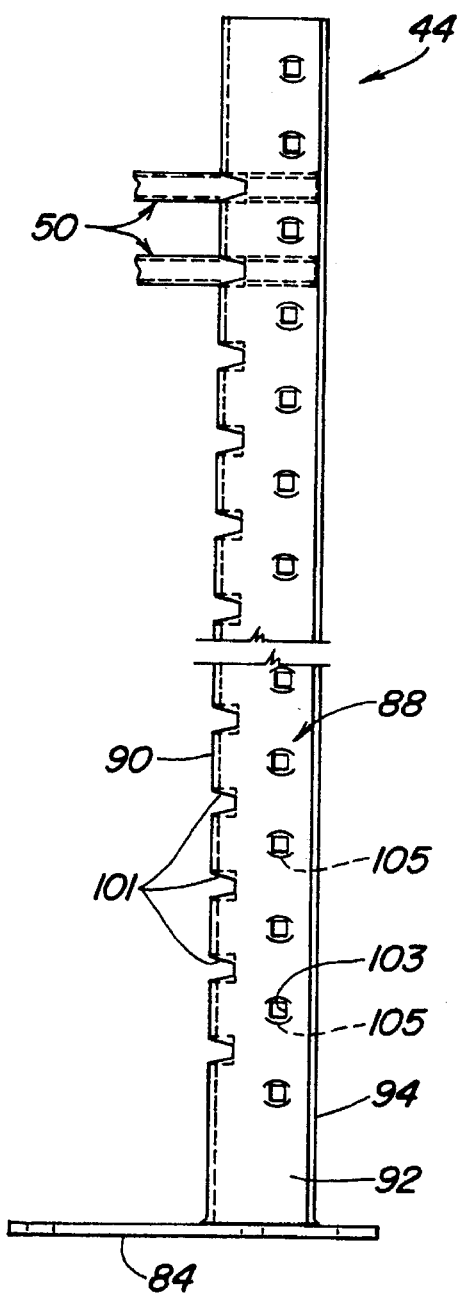
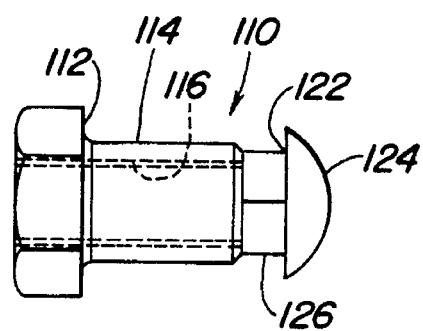
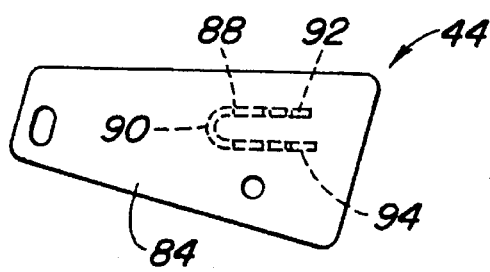
FIG. 5
FIG. 8
FIG. 6

5,622,038

GRID BAR STRUCTURE FOR A COTTON HARVESTER ROW UNIT

BACKGROUND OF THE INVENTION

1) Field of the Invention

The present invention relates generally to cotton harvesters and, more specifically, to grid bar structure located between the spindle drums and the row receiving area of a cotton picker row unit.

2) Related Art

Cotton harvesters of the spindle type such as the John Deere model 9960 Cotton Picker include row units with upright picker drums having spindles which project into a row receiving area through a plurality of grid bars which are supported from the unit by forward and aft support structures in vertically spaced and parallel relationship. The grid bars help move the cotton plants into proper picking relationship with the spindles and help prevent plant stalks and other debris from being pulled around into the picker drums and doffer area of the row unit. Heretofore, many of the grid bars were fabricated from a steel sheet metal blank with various bends and flanges being formed in the blank to provide strength and rigidity. The bars are relatively heavy, difficult to form and expensive. Since the bars are constantly brushing against the cotton plants, they are subject to damage and require frequent replacement.

Other types of grid bars are available on the market, including solid and relatively massive aluminum bars. However, these bars are usually heavy and expensive to manufacture.

The support structures to which the ends of the bars are fastened reduce crop clearance and provide opportunity for trash build-up. Sharp edges on the supports can also cause hairpinning of trash, and areas where there is clearance between bars and supports can catch stalks or other debris. Providing a tight, reliable fit between the supports and the grid bars while retaining fast, easy replaceability of the bars has been a continuing problem. Over- or under-tightening of the bolts securing the bars to the supports can result in bar damage or loss.

BRIEF SUMMARY OF THE INVENTION

It is therefore an object of the present invention to provide an improved grid bar structure for a cotton harvester. It is a further object to provide such an improved grid bar structure which overcomes at least most or all of the aforementioned problems.

It is a further object of the present invention to provide an improved grid bar structure which is lighter and easier to fabricate than at least most previously available structures. It is a further object to provide such a grid bar structure which has a unique cross section for increasing bar wear life without significantly increasing bar weight or cost.

It is still another object of the present invention to provide an improved grid bar structure having a grid bar mounting that reliably secures the bars in position while permitting fast, easy replacement if the bar becomes damaged or worn. It is yet another object to provide such a structure which reduces problems of trash build-up. It is still another object to provide such a structure which optimizes crop clearance and prevents hairpinning of plant debris.

A grid bar structure constructed in accordance with the teachings of the present invention includes a grid bar fabricated from a light extruded material such as aluminum and which has a hollow D-shaped cross section with a plant contacting wall of thickness substantially greater than the non-contacting walls for increased wearability and strength and reduced weight. An upright grid bar support with a compact U-shaped cross section includes opposed flanges connected by a rounded portion to reduce hairpinning of debris. Specially shaped apertures in the rounded portion closely conform to the grid bar cross section to provide excellent bar support and eliminate areas where trash can catch and lodge. Grid bar posts cooperate with threaded screw members extending through the support to sandwich the grid bar ends between the flanges with a preselected clamping force and prevent damage from over-tightening.

These and other objects, features and advantages of the present invention will become apparent to one skilled in the art upon reading the following detailed description in view of the drawings.

BRIEF DESCRIPTION OF THE DRAWINGS

FIG. 2 is an enlarged top view of the grid bar of FIG. 1.

FIG. 3 is a sectional view of the grid bar taken along lines 3—3 of FIG. 2.

FIG. 4 is side view of the bar of FIG. 2.

FIG. 5 is a side view of the grid bar support.

FIG. 6 is a bottom view of the support of FIG. 5.

FIG. 8 is a side view of the grid bar post utilized to sandwich one end of the grid bar between the flanges of the support upright portion.

DETAILED DESCRIPTION OF THE DRAWINGS

Figure 1:
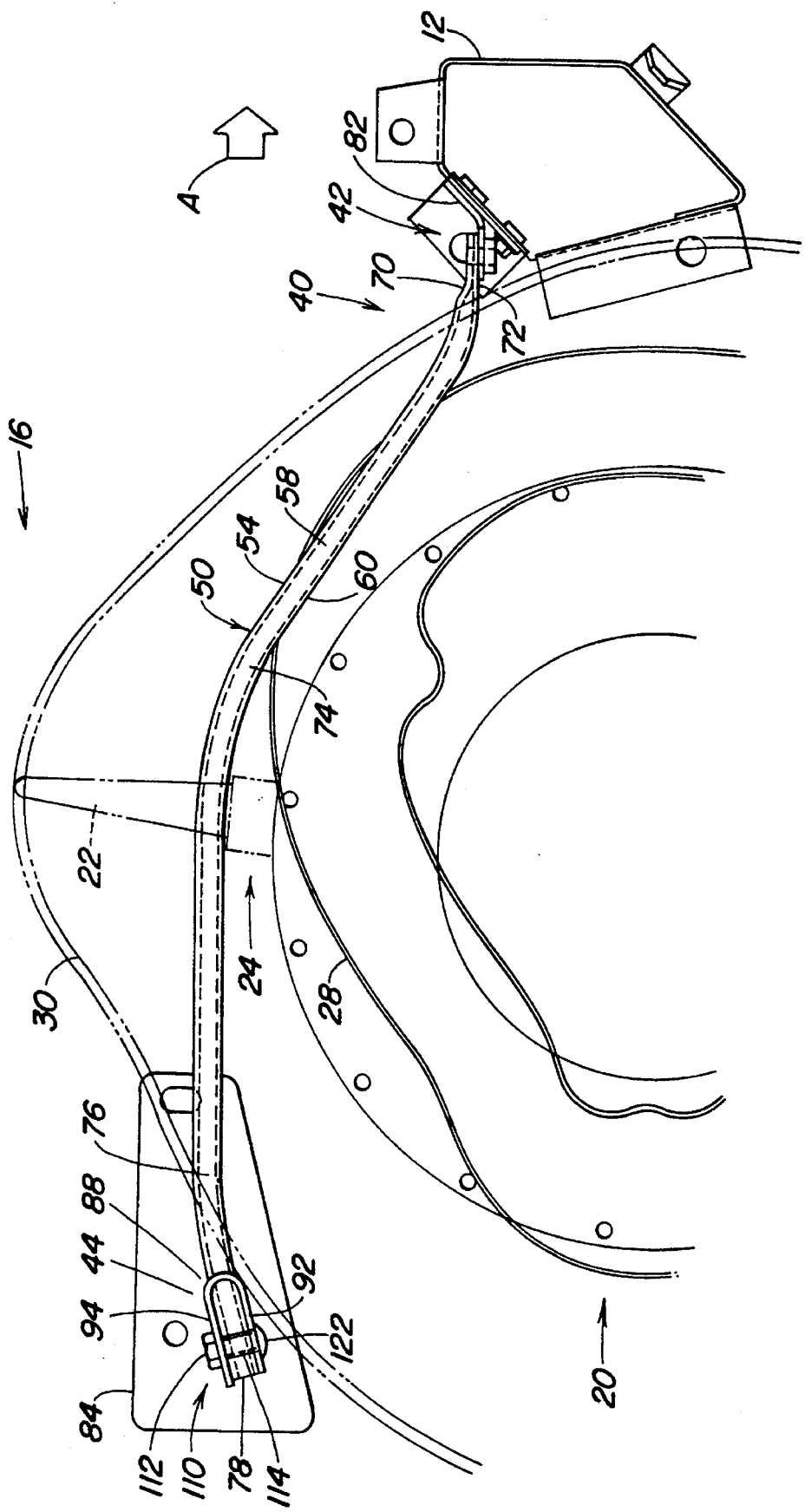
FIG. 1 is a top view of a portion of a cotton harvester row unit showing the location of a grid bar relative to the picking drum.

Referring now to FIG. 1, therein is shown a portion of a conventional cotton picker row unit 10 having a row unit frame or cabinet 12 supported for forward movement (arrow A) over a field having parallel rows of cotton plants. The row unit includes a row receiving area indicated generally at 16 located on one side of upright picker drum structure 20. The picker drum structure 20 includes columns of spindles 22 supported in rows by upright picker bars 24. An upper cam 28 supported near the top of the row unit 10 orients the spindles along parallel and generally horizontal spindle paths indicated at 30. As the spindles 22 in each row move along the path 30 and into the row receiving area 16, they are rotated in contact the cotton plants to remove cotton from the plants. The speed of the drum structure 20 is synchronized with the forward speed of the row unit 10 to provide generally zero forward velocity between the spindles 22 and the plants as cotton is removed. Thereafter, the cotton wrapped spindle 22 moves inwardly from the row receiving area 16 towards doffer structure (not shown) which removes the cotton and directs the cotton towards door structure.

Grid structure indicated generally at 40 in FIG. 1 is interposed between the row receiving area 16 and the drum 20 to guide the cotton plants around the drum area and to prevent plants and other debris from being pulled into the drum and doffer area. The spindles 22 project through the grid structure 40 and into the row receiving area 16 to remove cotton from the plants, and then the cotton wrapped spindles 22 are retracted from the grid structure to leave the plant stalks and other debris in the row receiving area.

The grid structure 40 includes forward mounting structure 42 (FIG. 1) located near the forward extremity of the spindle path 30 and aft mounting structure 44 located immediately rearwardly of the location where the spindles 22 move out of the row receiving area 16. A plurality of parallel, uniformly spaced grid bars 50 are supported between the rows of spindles 22 and lie substantially parallel to the spindle paths 30.

As best seen in FIGS. 2–4, each grid bar 50 is hollow for reduced weight and has a generally D-shaped cross section (FIG. 3) having an outer straight wall 52 with a crop contacting face 54. A pair of rearwardly converging walls 56 and 58 extend from the wall 52 to a rear wall 60. The outer wall 52 is substantially thicker than the remaining walls 56–60 for strength and increased wear life. In the preferred embodiment, the bar 50 is extruded from aluminum or other strong, wear resistant material having a weight substantially less than steel.

The grid bar 50 includes a forwardly projecting end 70 which is flattened and apertured at 72. The bar 50 extends rearwardly and outwardly in the direction of the row receiving area 16 to a first bend location 74. The bar extends rearwardly and slightly inwardly from the bend location 74 to a second bend location 76 where the bar angle inwardly at a slightly greater angle. The bar 50 terminates in a non-flattened rear portion 78 which is offset outwardly from the flattened end 70.

The forward mounting structure 42 includes an upright apertured flange member 82 connected to a portion of the row unit frame adjacent to the forwardmost extremity of the spindle path 30. The apertures in the flange member 82 are uniformly spaced and are centered between the rows of spindles 22. The apertures 72 in the flattened ends of the grid bars align with the apertures in the flange member, and bolts (not shown) secure the end 70 to the member.

Figure 7:
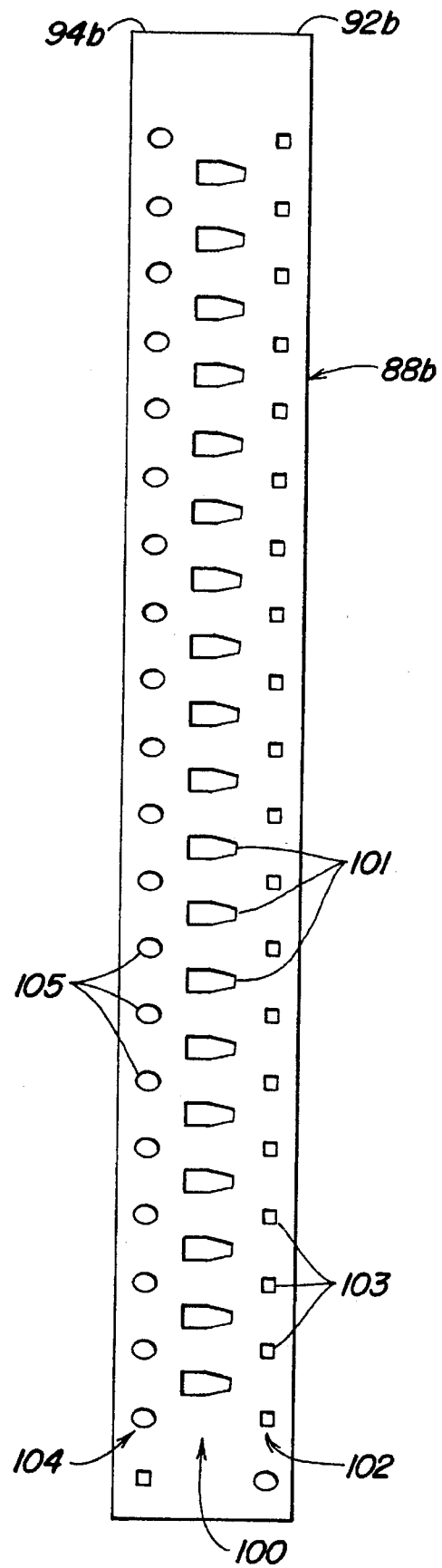
FIG. 7 is a plan view of the upright portion of the grid bar support of FIG. 5 prior to bending into the final U-shaped cross section shown in FIG. 6.

The aft mounting structure 44 includes a base plate 84 bolted to the floor of the row unit 10 and an upright U-shaped column or channel 88 fixed to the plate 84 such that the channel 88 opens in the rearward direction. The channel 88 has a rounded forward portion 90 connecting two opposed flanges 92 and 94. Preferably, the channel 88 is fabricated from a piece of flat sheet steel 88b (FIG. 7) having sides 92b and 94b which, when the sheet is formed into the channel 88, define the flanges 92 and 94. Three columns of apertures are formed in the sheet 88b, including a central column 100 of elongated, tapering slots 101, a side column 102 of square apertures 103 centered in the vertical direction between the slots 101, and an opposite side column 104 of rounded apertures 105 (FIG. 7) aligned vertically with the apertures 103. The blank 88b is bent about the column 100 to form the rounded forward portion 90, and the tapered slots 101 form shaped apertures which closely conform to the cross section of the bar 50. The aft ends 78 of the bars are inserted through the apertures 101 and as shown in FIG. 1 generally align with the rear edge of the flange 92. The ends 78 are sandwiched between the flanges 92 and 94 and are secured by bolt structure 110 (FIGS. 1 and 8)inserted through aligned pairs of the apertures 103 and 105 in the flanges. The bolt structure 110, described in detail below, clamps the flanges 92 and 94 with sufficient force to securely hold the aft ends of the bars 50 in place but includes shoulder structure to prevent damage to the column 88 by over-tightening. The periphery of the slots 101 closes around the periphery of the bar 50 supported therein so stalks and debris do not catch around the slots. Debris slides off the rounded forward portion 90 which lies closely adjacent the spindle path 30 and presents a narrow profile for increased crop and trash clearance.

The bolt structure 110 as shown in FIGS. 1 and 8 includes a post 112 with a headed shaft 114 adapted for receipt in an aperture 104. The shaft 114 includes an internally threaded bore 116 which extends completely through the post 112. A mating carriage bolt 122 having a rounded head 124 and a square indexing portion 126 adapted for receipt by the square apertures 103 in the flange 92 is inserted through an aperture pair 103, 105. The post 112 is then screwed onto the threaded shaft of the bolt 122 until the bottom of the post shaft 114 abuts the portion 126. The length of the shaft 114 is approximately equal to the distance between the flanges 92 and 94, and when the post 112 is tightened on the bolt 122, the flanges firmly clamp the bar end 78 without damage to the column 88 or the bar 50. A bar 50 can be easily removed by removing the securing bolt from the apertures 70 and 72 and loosening the bolt structure 110.

Having described the preferred embodiment, it will become apparent that various modifications can be made without departing from the scope of the invention as defined in the accompanying claims.

We claim:

1. In a cotton harvester row unit having upright picker drum structure and a row receiving area for receiving a row of cotton plants, grid structure interposed between the drum structure from the row receiving area, the grid structure comprising:

a plurality of fore-and-aft extending grid bars supported from the row unit, each of the grid bars comprising a tubular structure having a hollow interior; and wherein the grid bars have a D-shaped cross section with a straight section and a rounded section connected to the straight section, and wherein the straight section has a thickness substantially greater than the rounded section, wherein the tubular structure comprises wall structure having a crop contacting wall adapted for contacting the row of plants as the plants enter the row receiving area, and connecting walls defining with the crop contacting wall a generally closed, hollow interior portion, wherein the crop contacting wall includes wear extending structure increasing the wear life of the crop contacting wall.

2. The invention as set forth in claim 1 wherein the tubular structure comprises extruded aluminum members.

3. The invention as set forth in claim 1 wherein the crop contacting wall has a thickness substantially greater than the connecting walls to thereby increase wearability of the crop contacting wall while limiting the weight of the tubular structure.

4. The invention as set forth in claim 3 wherein the tubular structure comprises an aluminum extrusion having a first flattened connecting end and an opposite non-flattened end, the flattened end adapted for receiving a mounting bolt attaching the flattened end to the row unit and the non-flattened end adapted for receipt by a compression member frictionally engaging the non-flattened end.

5. The invention as set forth in claim 1 further comprising grid bar mounting structure connected to the row unit, the mounting structure including an upright U-channel including opening structure for receiving an end of the tubular structure, and a bolt member for tightening the U-channel against the end of the tubular structure.

6. In a cotton harvester row unit having upright picker drum structure and a row receiving area for receiving a row of cotton plants, grid structure interposed between the drum structure from the row receiving area, the grid structure comprising:

a plurality of fore-and-aft extending grid bars supported from the row unit, each of the grid bars comprising a tubular structure having a hollow interior, wherein the grid bars have a D-shaped cross section with a straight section and a rounded section connected to the straight section, and wherein the straight section has a thickness substantially greater than the rounded section, grid bar mounting structure connected to the row unit, the mounting structure including an upright U-channel including opening structure for receiving an end of the tubular structure, and a bolt member for tightening the U-channel against the end of the tubular structure; and wherein the U-channel includes a pair of flanges connected by a rounded portion and wherein the opening structure comprises slots in the rounded portion conforming generally to the shape of the tubular structure.

7. The invention as set forth in claim 6 including a plurality of bolt members located between adjacent slots for sandwiching the end of the tubular structure between the flanges.

8. The invention as set forth in claim 7 wherein the bolt members include a shouldered threaded member providing a preselected pressure on the tubular structure by the flanges.

9. In a cotton harvester row unit having upright picker drum structure and a row receiving area for receiving a row of cotton plants, grid structure interposed between the drum structure from the row receiving area, the grid structure comprising:

a plurality of fore-and-aft extending grid bars supported from the row unit, each of the grid bars comprising a tubular structure having a closed, hollow interior; and wherein the tubular structure has D-shaped cross section, and wherein the D-shaped cross section includes walls includes a straight section and a rounded section connected to the straight section, and wherein the straight section has a thickness substantially greater than the rounded section connected to a crop contacting face, the crop contacting face having a thickness substantially greater than the thickness of the walls.

10. The invention as set forth in claim 9 wherein the crop contacting face is substantially flat.

11. A grid bar for a cotton picker harvester row unit adapted for contacting a row of cotton plants, the grid bar comprising a hollow closed tubular member fabricated from a material having a specific gravity equal to or less than that of aluminum and wherein the grid bars have a D-shaped cross section with a straight section and a rounded section connected to the straight section, and wherein the straight section has a thickness substantially greater than the rounded section, wherein the D-shaped cross section defines a cotton contacting face and a wall portion connected to the face, wherein the thickness of the cotton contacting face is substantially greater than that of the wall portion.

12. Grid bar structure for a cotton harvester row unit having a housing with an upright picker drum supported within the housing adjacent a row receiving area for receiving a row of cotton plants to be harvested, the grid bar structure including:

a plurality of grid bars, each having first and second ends;

wherein the grid bars have a D-shaped cross section with a straight section and a rounded section connected to the straight section, and wherein the straight section has a thickness substantially greater than the rounded section, an upright grid bar support connected to the housing and having a generally U-shaped cross section with opposed flanges connected by a bight portion, wherein the bight portion includes aperture structure for receiving the first ends of the grid bars in vertically spaced relation;

clamping structure connected to the grid bar support and releasibly sandwiching the first ends between the flanges; and mounting structure connecting the second ends of the grid bars to the housing with the grid bars extending in generally parallel relationship to each other.

13. The invention as set forth in claim 12 wherein the clamping structure includes a shouldered threaded member connected between adjacent grid bars and urging the flanges against the grid bar first ends.

14. The invention as set forth in claim 12 wherein the clamping structure comprises an upright column having a cross section with a forwardly directed rounded surface closely adjacent the picker drum so that the plants and plant debris slide off the clamping structure.

15. The invention as set forth in claim 14 wherein the grid bars have a cross section including a cotton plant contacting portion and an offset portion opposite the plant contacting portion, the cotton plant contacting portion having a thickness substantially greater than that of the offset portion for increased wearability and strength.

16. The invention as set forth in claim 14 wherein the first ends of the grid bars have a preselected cross section and the rounded surface includes apertures, the apertures conforming to the preselected cross section to prevent plant material from catching between the grid bars and the clamping structure.

* * * * *